(12) United States Patent
Lin (10) Patent No.: US 8,013,934 B2
(45) Date of Patent: Sep. 6, 2011

(54) PORTABLE ELECTRONIC DEVICE WITH CAMERA MODULE

(75) Inventor: Yi-Peng Lin, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 405 days.

(21) Appl. No.: 12/346,815

(22) Filed: Dec. 30, 2008

(65) Prior Publication Data

US 2010/0079661 A1 Apr. 1, 2010

(30) Foreign Application Priority Data

Sep. 26, 2008 (CN) .......................... 2008 1 0304686

(51) Int. Cl.
*H04N 5/225* (2006.01)
*H04N 5/222* (2006.01)
(52) U.S. Cl. ........................ 348/376; 348/371
(58) Field of Classification Search .................. None
See application file for complete search history.

(56) References Cited

U.S. PATENT DOCUMENTS

| | | | | |
|---|---|---|---|---|
| 4,106,037 A | * | 8/1978 | Nakamura et al. ............. | 396/178 |
| 4,589,747 A | * | 5/1986 | Nakayama et al. ............ | 396/177 |
| 5,212,510 A | * | 5/1993 | Baxter ............................ | 396/349 |
| 5,565,942 A | * | 10/1996 | Hagimoto et al. ............. | 396/177 |
| 5,740,480 A | * | 4/1998 | Kuhn et al. .................... | 396/177 |
| 5,987,263 A | * | 11/1999 | Toyoda et al. ................. | 396/178 |
| 6,122,526 A | * | 9/2000 | Parulski et al. .............. | 455/556.1 |
| 6,264,378 B1 | * | 7/2001 | Katoh et al. .................. | 396/348 |
| 6,322,259 B1 | * | 11/2001 | Miyamoto et al. ............. | 396/448 |
| 7,738,785 B2 | * | 6/2010 | Misawa ......................... | 396/299 |
| 2002/0015593 A1 | * | 2/2002 | Kai et al. ....................... | 396/419 |
| 2002/0158983 A1 | * | 10/2002 | Fellegara et al. ........ | 348/333.11 |
| 2003/0181225 A1 | * | 9/2003 | Hasegawa et al. ............. | 455/566 |
| 2006/0088311 A1 | * | 4/2006 | Lu .................................. | 396/448 |

* cited by examiner

*Primary Examiner* — Lin Ye
*Assistant Examiner* — Dennis Hogue
(74) *Attorney, Agent, or Firm* — Altis Law Group, Inc.

(57) ABSTRACT

An exemplary portable electronic device includes: a main body, a camera module, a protecting cover, and a fill-in light emitting module. The camera module has a camera, and the camera module is disposed in the main body. The camera is exposed and positioned against an outer surface of the main body to take pictures. The fill-in light emitting module is fixed on the protecting cover. The protecting cover is movably connected to the main body adjacent to the camera for covering the camera or exposing the camera.

13 Claims, 9 Drawing Sheets

PORTABLE ELECTRONIC DEVICE WITH CAMERA MODULE

BACKGROUND

1. Technical Field

The present disclosure relates to portable electronic devices, and particularly to a portable electronic device with a camera module.

2. Description of the Related Art

With the development of wireless communication and information processing technologies, portable electronic devices, such as mobile telephones and personal digital assistants, are now in widespread use. These portable electronic devices may comprise a camera module for capturing images. Cameras capture an image by recording the light that enters an aperture of the camera, from a subject.

In order to improve the quality of an image in low light conditions, many camera modules use an electronic flash. An electronic flash is arranged so that at the time that the image is captured, a burst of light is emitted in the direction from which the image is captured, improving the quality of the image. However, the electronic flash is disposed in a main body of the portable electronic device resulting in the portable electronic device being unduly bulky.

What is needed, therefore, is a new portable electronic device to overcome the above-described shortcomings.

BRIEF DESCRIPTION OF THE DRAWINGS

Many aspects of the present portable electronic device can be better understood with reference to the following drawings. The components in the drawings are not necessarily drawn to scale, the emphasis instead being placed upon clearly illustrating the principles of the present method. Moreover, in the drawings, like reference numerals designate corresponding parts throughout the several views.

DETAILED DESCRIPTION

Figure 1:
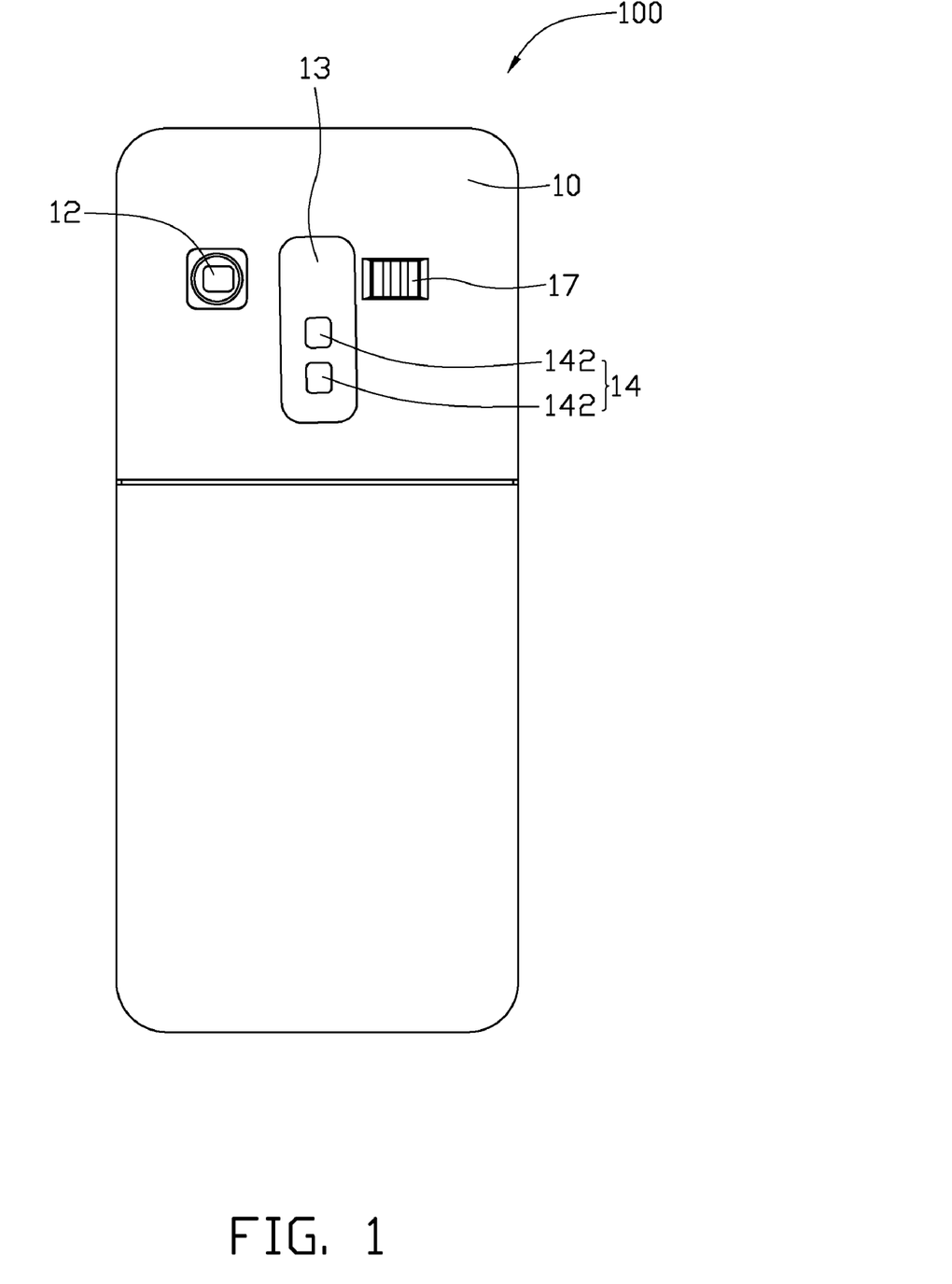
FIG. 1 is a schematic back view of a portable electronic device according to a first exemplary embodiment of the present disclosure.
Figure 2:
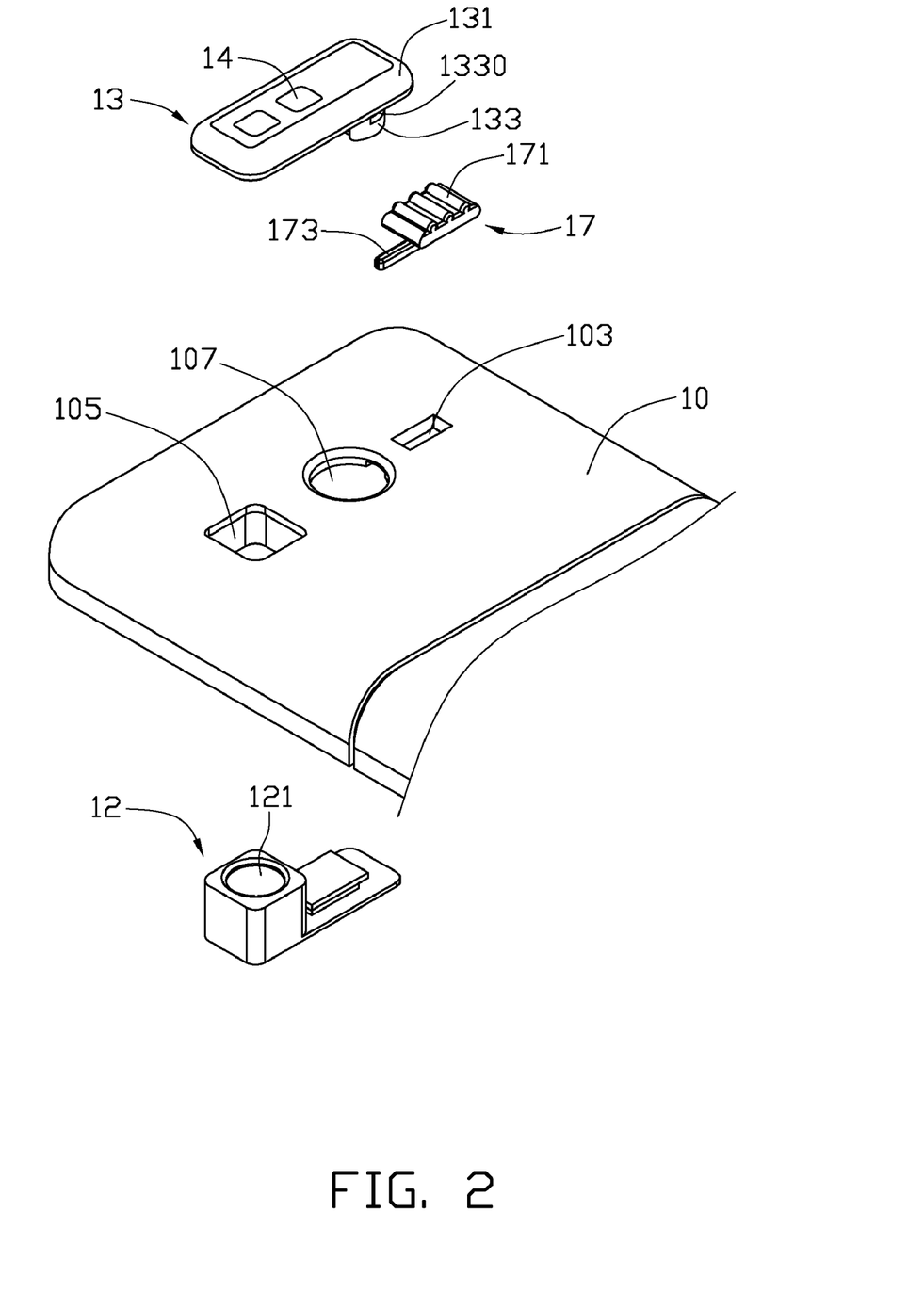
FIG. 2 is a schematic partial, exploded isometric view of the portable electronic device of FIG. 1.
Figure 3:
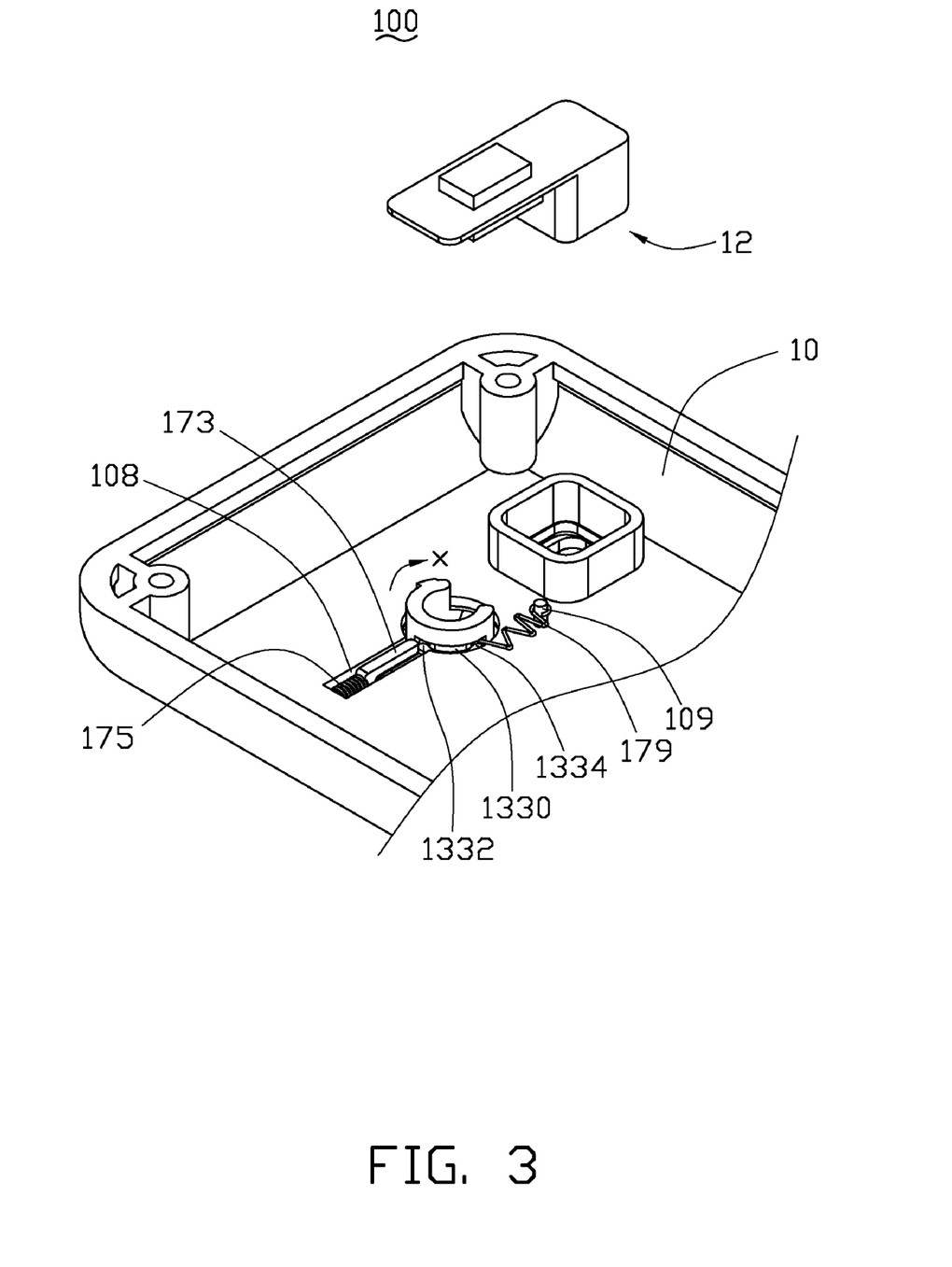
FIG. 3 is similar to FIG. 2, but viewed from another aspect.

Referring to FIGS. 1 through 3, a portable electronic device 100 in accordance with a first exemplary embodiment includes a main body 10, a camera module 12, a protecting cover 13, a fill-in light emitting module 14 and a control member 17. The camera module 12 includes a camera 121. The camera module 12 is disposed in the main body 10. The fill-in light emitting module 14 is fixed on the protecting cover 13. The protecting cover 13 with the fill-in light emitting module 14 is movably connected to the main body 10 adjacent to the camera 121 for covering the camera 121 or exposing the camera 121.

Referring to FIGS. 2 and 3, the main body 10 defines an elongated guide hole 103, a circular pivoting hole 107 and a rectangular mounting hole 105. The guide hole 13, the pivoting hole 107 and the mounting hole 105 are aligned in a straight line adjacent to an edge of the main body 10. The camera 121 is exposed out of an outer surface of the main body 10 through the mounting hole 105.

The protecting cover 13 includes a cover 131 and a pivotal shaft 133 fixed to a bottom surface of the cover 131. The fill-in light emitting module 14 includes a plurality of light emitting diodes 142 separately disposed on an upper surface of the cover 131. In this embodiment, the fill-in light emitting module 14 includes two light emitting diodes 142. The fill-in light emitting module 14 further includes a controller (not shown) to control the light emitting diodes 142 to illuminate.

The pivotal shaft 133 is rotatably mounted into the pivoting hole 107 of the main body 10. The pivotal shaft 133 is columnar, and has a C-shaped cross section taken along a plane perpendicular to an axis of the pivotal shaft 133. The pivotal shaft 133 defines an arcuate sliding slot 1330 in an outer surface of the pivotal shaft 133 coplanar with the inner surface of the main body 10. In this embodiment, an arcuate angle of the arcuate sliding slot 1330 is 90 degrees. The pivotal shaft 133 further defines a first positioning groove 1332 and a second positioning groove 1334 at the two ends of the arcuate sliding slot 1330. In this embodiment, a depth of the first positioning groove 1332 is lower than that of the second positioning groove 1334.

The main body 10 further defines a guide slot 108 in an inner surface of the main body 10. The guide slot 108 communicates with the guide hole 103 and extends toward the pivoting hole 107 to communicate with the pivoting hole 107. The control member 17 includes a control plate 171, a mounting shaft 173, a columnar spring 175 and a torsion spring 179. The control plate 171 is fixed on an end of the mounting shaft 173. The mounting shaft 173 is disposed in the guide slot 108 in the main body 10, and the control plate 171 is exposed out of the main body 10. The columnar spring 175 is fixed in the guide slot 108 at a side of one end of the mounting shaft 173 away from the pivotal shaft 133. The columnar spring 175 is configured for providing an axial force for pressing the mounting shaft 173 toward the pivotal shaft 133. The mounting shaft 173 is tightly secured in the guide slot 108 due to the axial force. The main body 10 further includes a fixing block 109 protruding out from an inner surface of the main body 10 between the pivoting hole 107 and the engaging hole 105. One end of the torsion spring 179 is fixed to the fixing block 109, and the other end of the torsion spring 179 is fixed to the second positioning groove 1334. The torsion spring 179 is configured for providing a torsion force towards the pivotal shaft 133.

When the protecting cover 13 covers the camera 121 of the camera module 12, the torsion spring 179 is in an original state and the columnar spring 175 provides the axial force pressing the mounting shaft 173 of the control member 17 to resist to the pivotal shaft 133. When a user rotates pivotal shaft 133 along an X-direction, the torsion spring is transformed until the end of the mounting shaft 173 is received into the first positioning groove 1332. Thus, the protecting cover 13 with the fill-in light emitting module 14 is moved relative to the mounting hole 105 to expose the camera 121 of the camera module 12. The user can slide the control plate 171 of the control member 17 to make the mounting shaft 173 move out of the first positioning groove 1332 of the pivotal shaft 133.

Accordingly, the torsion spring 179 provides a resilient force to rotate the pivotal shaft 133 to the original state, such that the protecting cover 13 covers the camera 121 of the camera module 12.

Figure 4:
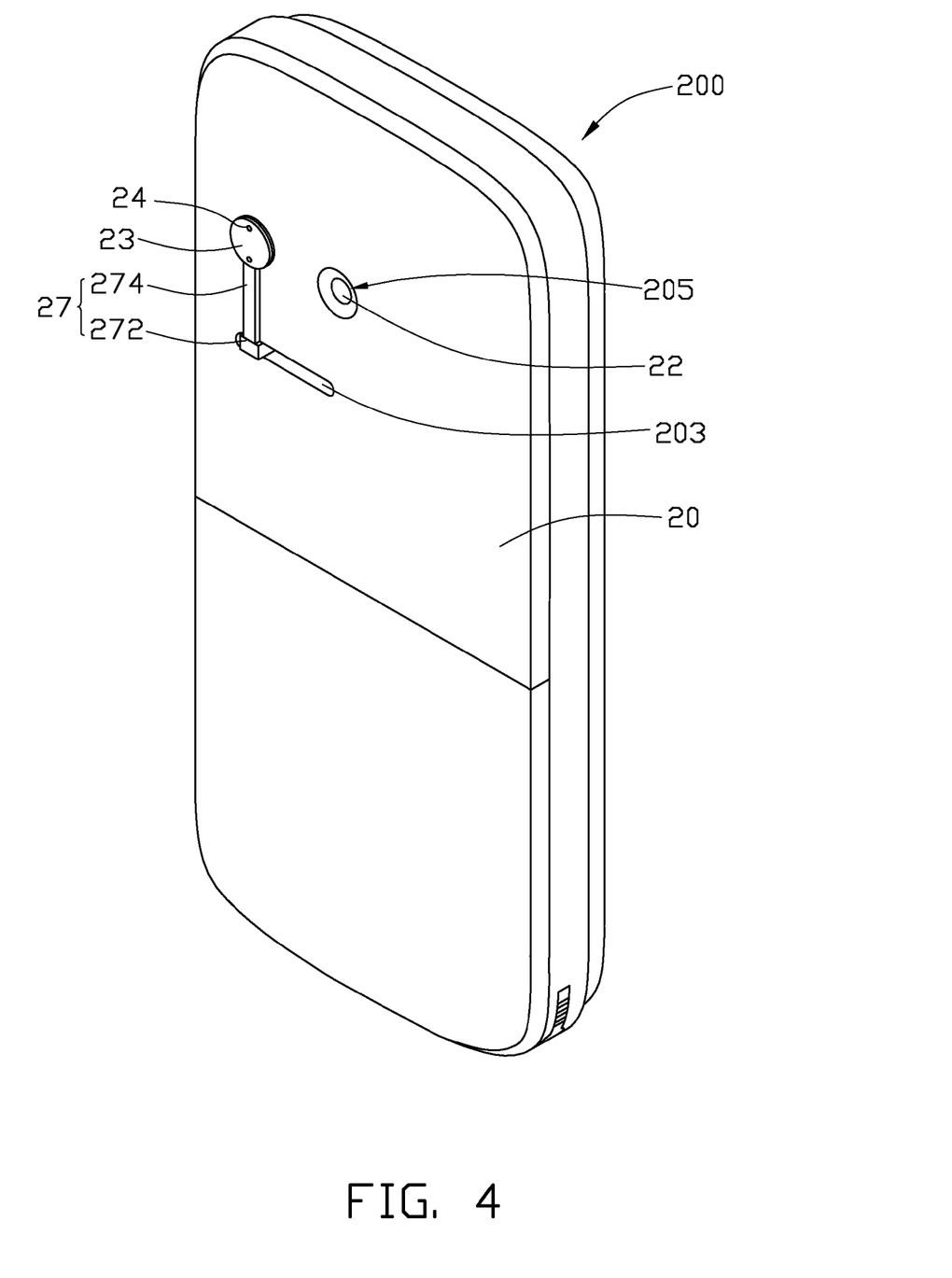
FIG. 4 is a schematic isometric view of a portable electronic device according to a second exemplary embodiment of the present disclosure.
Figure 5:
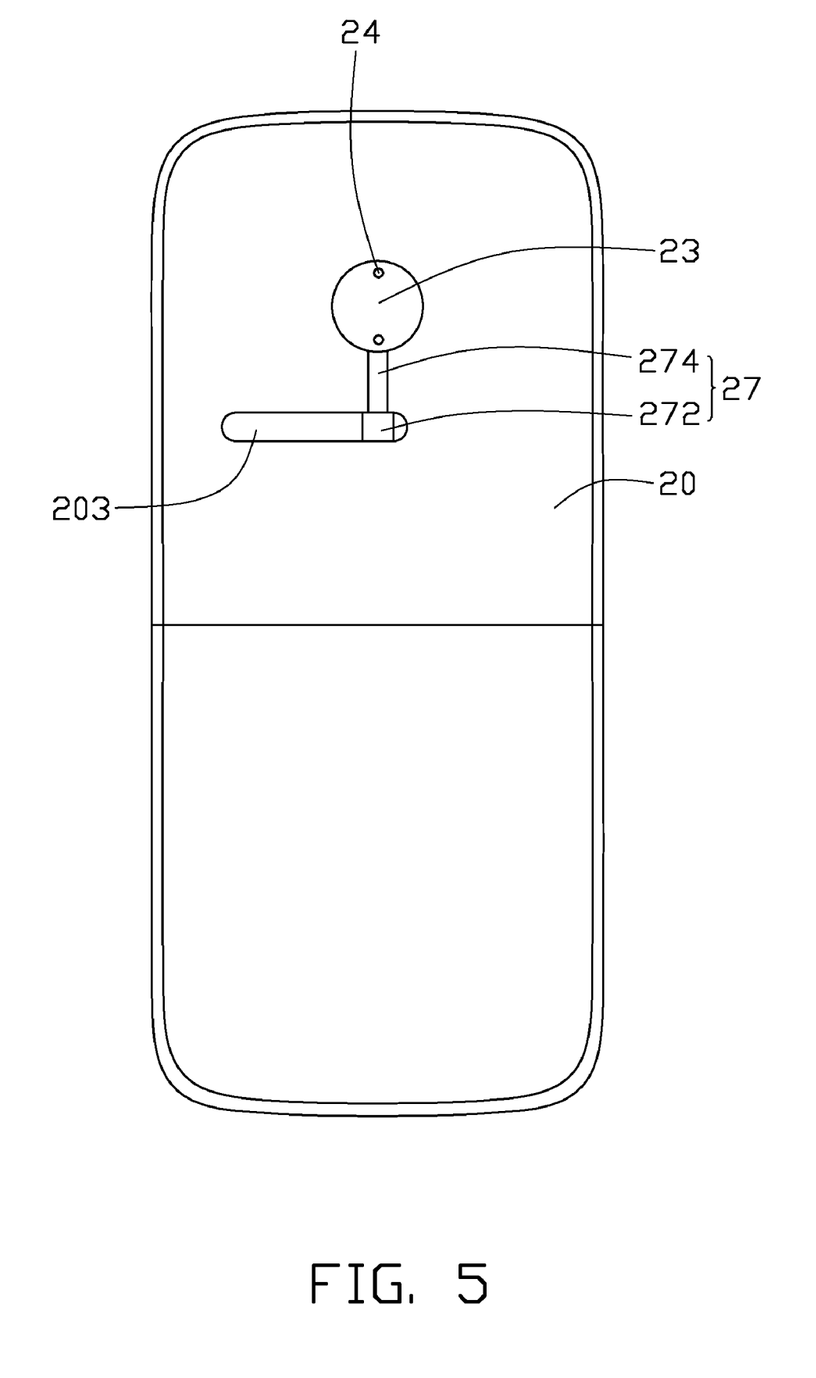
FIG. 5 is a schematic back view of the portable electronic device of FIG. 4.

Referring to FIGS. 4 and 5, a portable electronic device 200 in accordance with a second exemplary embodiment includes a main body 20, a camera module 22 having a camera (not labeled), a protecting cover 23, a fill-in light emitting module 24 and a control member 27.

The main body 20 defines an engaging hole 205, and an elongated guide hole 203 below the engaging hole 205. The elongated guide hole 203 extends along a direction perpendicular to a longer edge of the main body 20. The camera module 22 is disposed in the main body 20 except exposing the camera via the engaging hole 205. The control member 27 includes a sliding member 272 and a connecting member 274. The sliding member 272 is slidably engaged in the elongated guide hole 203. The connecting member 274 is a straight rod interconnecting with the protecting cover 23 and the sliding member 272. The fill-in light emitting module 24 is fixed on the protecting cover 23.

In an original state, the sliding member 272 is adjacent to one end of the elongated guide hole 203, and the protecting cover 23 covers the camera of the camera module 22. When a user slides the sliding member 272 along the elongated guide hole 203 to another end of the elongated guide hole 203, the protecting cover 23 is moved away from the engaging hole 205. Thus, the camera of the camera module 22 is exposed to capture an image. The fill-in light emitting module 24 helps to provide more light when taking pictures.

Figure 6:
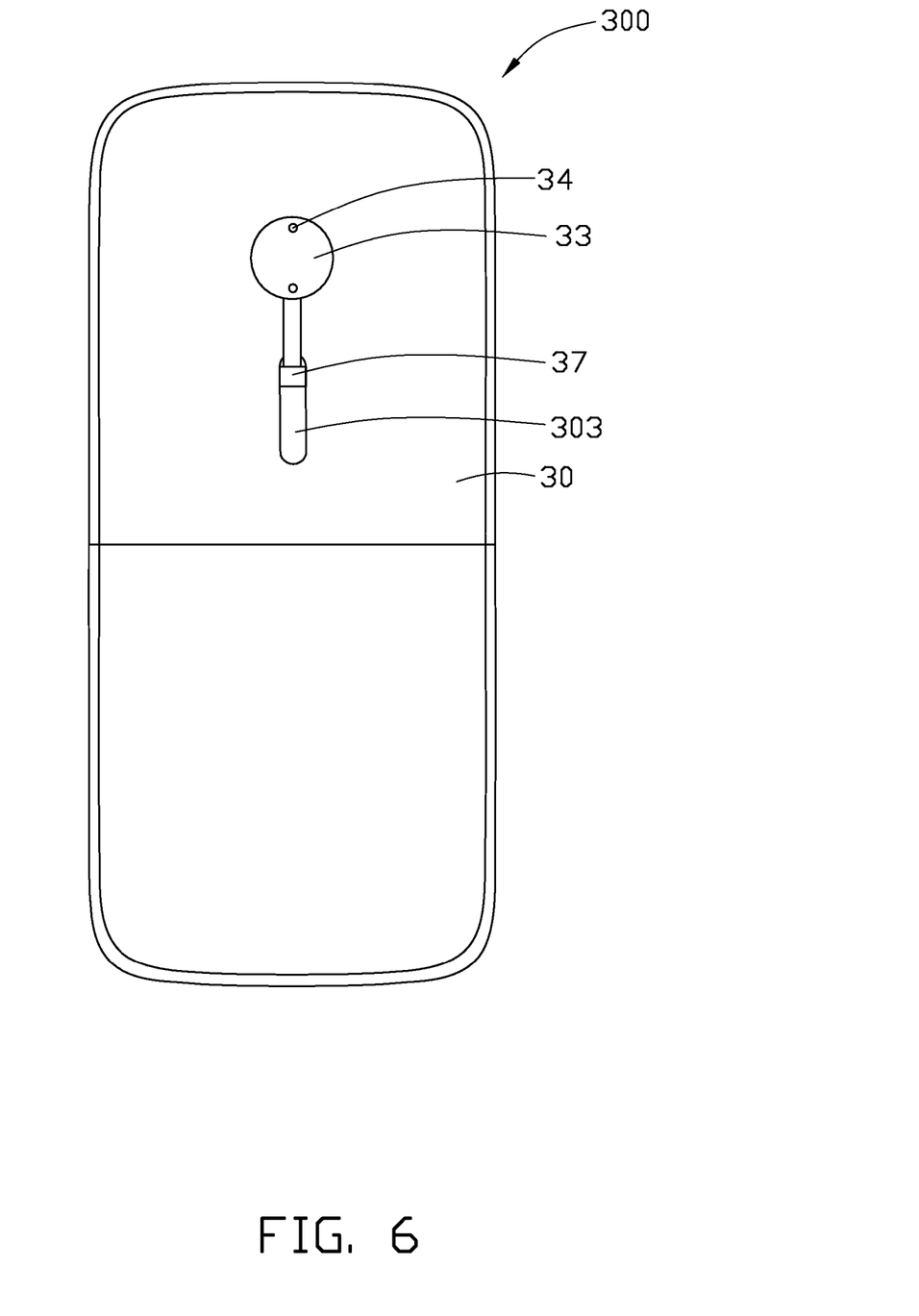
FIG. 6 is a schematic back view of a portable electronic device according to a third exemplary embodiment of the present disclosure.
Figure 7:
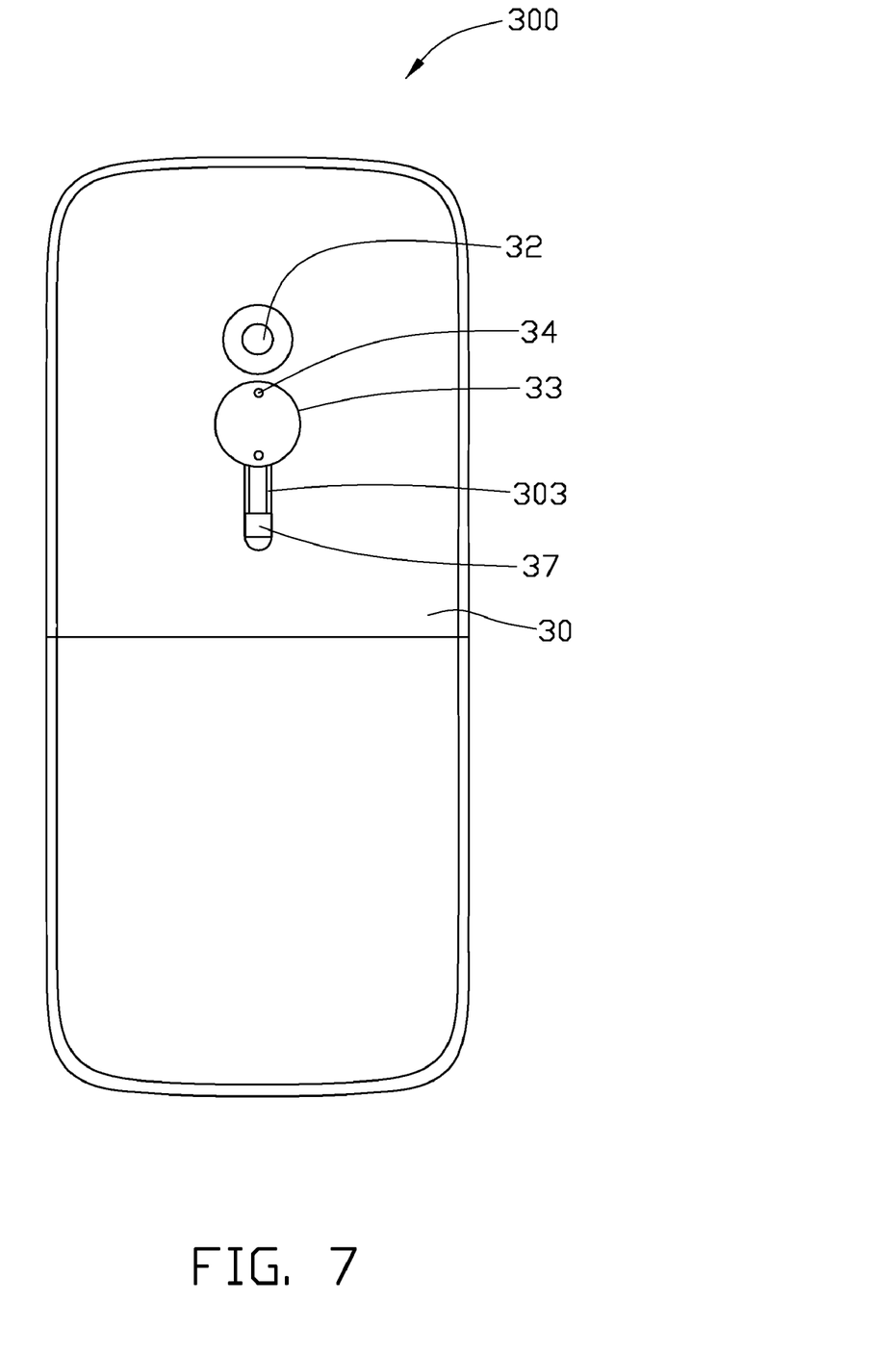
FIG. 7 is similar to FIG. 6, but showing a camera module.

Referring to FIGS. 6 and 7, a portable electronic device 300 in accordance with a third exemplary embodiment includes a main body 30, a camera module 32, a protecting cover 33, a fill-in light emitting module 34 and a control member 37. The portable electronic device 300 is similar as principle to the portable electronic device 200 of the second exemplary embodiment, except that the main body 30 defines an elongated guide hole 303 extends along a direction parallel to a longer edge of the main body 30.

Figure 8:
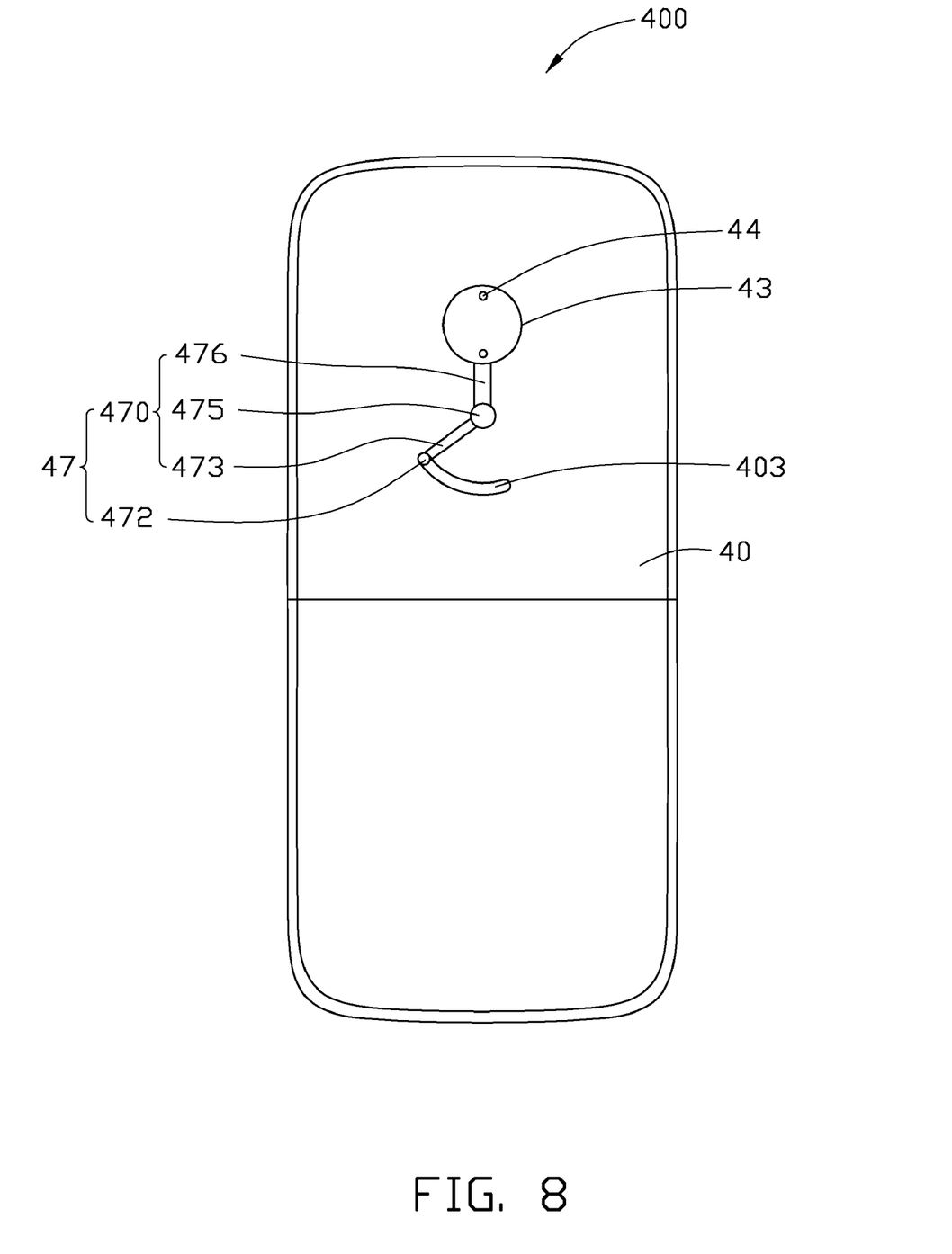
FIG. 8 is a schematic back view of a portable electronic device according to a fourth exemplary embodiment of the present disclosure.
Figure 9:
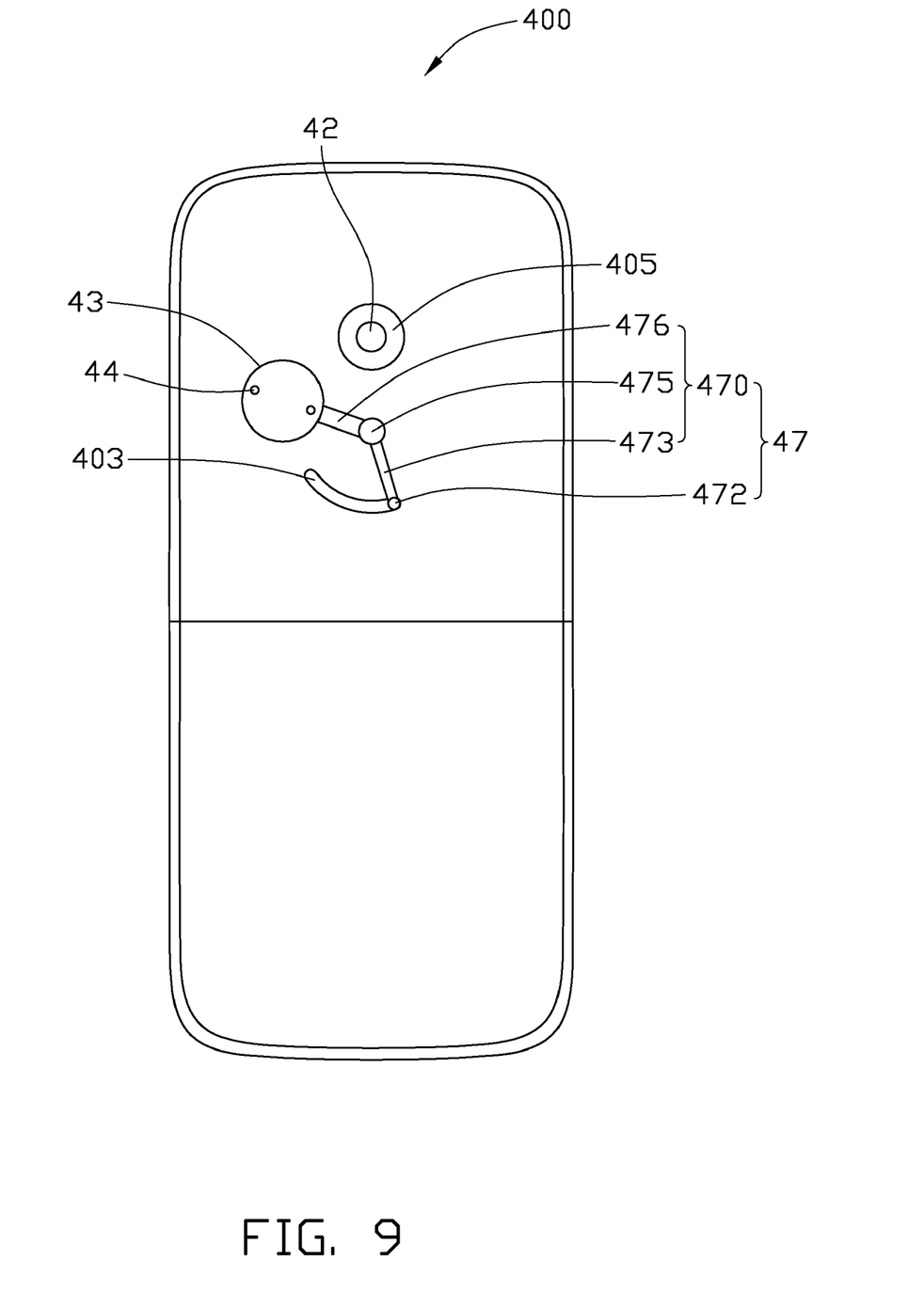
FIG. 9 is similar to FIG. 8, but showing a camera module.

Referring to FIGS. 8 and 9, a portable electronic device 400 in accordance with a fourth exemplary embodiment includes a main body 40, a camera module 42, a protecting cover 43, a fill-in light emitting module 44 and a control member 47. The portable electronic device 400 is similar as principle to the portable electronic device 200 of the second exemplary embodiment, except that the main body 40 defines a curved guide hole 403, and the control member 47 includes a two-armed connecting member 470 and a sliding member 472. The curved guide hole 403 extends along an arcuate part of a circle. The sliding member 472 is slidably engaged in the curved guide hole 403. The two-armed connecting member 47 includes a first arm 473, a fixing member 475, and a second arm 476. The fixing member 475 connects the first and second arms 473, 476. An angle defined by the first and second arms 473, 476 is constant. The first arm 473 is connected to the sliding member 472.

In an original state, the sliding member 472 is adjacent to one end of the curved guide hole 403, and the protecting cover 43 covers the camera module 42. When a user slides the sliding member 472 along the curved guide hole 403 to another end of the elongated guide hole 403, the protecting cover 43 is moved away from a mounting hole 405. Thus, the camera module 42 is exposed to capture an image. The fill-in light emitting module 44 helps to provide more light when taking pictures.

Finally, while the present disclosure has been described with reference to particular embodiments, the description is illustrative of the disclosure and is not to be construed as limiting the disclosure. Therefore, various modifications can be made to the embodiments by those skilled in the art without departing from the true spirit and scope of the disclosure as defined by the appended claims.

What is claimed is:

1. A portable electronic device comprising:
a main body defining an elongated guide hole, a pivoting hole adjacent to the guide hole, and a first hole;
a camera module having a camera, the camera module being disposed in the first hole of the main body, wherein the camera can be exposed through the first hole in an outer surface of the main body to take pictures;
a protecting cover comprising a cover and a pivotal shaft fixed to a bottom surface of the cover, the pivotal shaft being rotatably received in the pivoting hole;
a control member connected to the protecting cover and slidably engaged in the guide hole; and
a fill-in light emitting module fixed on the protecting cover, wherein sliding the control member causes the protecting cover to move relative to the first hole for covering the camera, the first hole is a mounting hole, the elongated guide hole, the pivoting hole and the mounting hole are aligned along a straight line, and the camera is exposed via the mounting hole.

2. The portable electronic device of claim 1, wherein the control member includes a control plate, a mounting shaft, and a columnar spring, the control plate is fixed on an end of the mounting shaft, the main body further defines a guide slot in an inner surface thereof, the guide slot communicates with the guide hole and extends toward the pivoting hole to communicate with the pivoting hole, and the mounting shaft is disposed in the guide slot and the control plate is out of the main body, the columnar spring is fixed in the guide slot at a side of one end of the mounting shaft for providing an axial force for pressing the mounting shaft towards the pivotal shaft.

3. The portable electronic device of claim 2, wherein the pivotal shaft defines an arcuate sliding slot in an outer surface of the pivotal shaft coplanar with the inner surface of the main body, and the pivotal shaft further defines a first positioning groove and a second positioning groove at the two ends of the arcuate sliding slot.

4. The portable electronic device of claim 3, wherein an arcuate angle of the arcuate sliding slot is 90 degrees.

5. The portable electronic device of claim 1, wherein a fixing block protrudes out from an inner surface of the main body between the pivoting hole and the mounting hole, the control member includes a torsion spring, one end of the torsion spring is fixed to the fixing block, and the other end of the torsion spring is fixed to the pivotal shaft providing a torsion force.

6. The portable electronic device of claim 5, wherein the pivotal shaft defines an arcuate sliding slot in an outer surface of the pivotal shaft coplanar with the inner surface of the main body, the pivotal shaft further defines a first positioning groove and a second positioning groove at the two ends of the arcuate sliding slot, the end of the torsion spring is fixed in the second positioning groove of the pivotal shaft, and when the pivotal shaft is rotated, the torsion spring is transformed until the end of the mounting shaft is received into the first positioning groove, such that the protecting cover with the fill-in light emitting module is moved to expose the camera.

7. A portable electronic device comprising:
a main body defining an elongated guide hole and a first hole;
a camera module having a camera, the camera module being disposed in the first hole of the main body, wherein the camera can be exposed through the first hole in an outer surface of the main body to take pictures;
a protecting cover;
a control member connected to the protecting cover and slidably engaged in the guide hole; and
a fill-in light emitting module fixed on the protecting cover, wherein sliding the control member causes the protecting cover to move relative to the first hole for covering the camera, the first hole is an engaging hole, the elongated guide hole is below the engaging hole, the camera module is disposed in the main body and exposes the camera via the engaging hole, the control member comprises a sliding member and a connecting member, the sliding member is slidably engaged in the elongated guide hole, and the connecting member interconnects with the protecting cover and the sliding member.

8. The portable electronic device of claim 7, wherein the elongated guide hole extends along a direction perpendicular to a longer edge of the main body.

9. The portable electronic device of claim 7, wherein the elongated guide hole extends along a direction parallel to a longer edge of the main body.

10. A portable electronic device comprising:
a main body defining an elongated guide hole and a first hole;
a camera module having a camera, the camera module being disposed in the first hole of the main body, wherein the camera can be exposed through the first hole in an outer surface of the main body to take pictures;
a protecting cover;
a control member connected to the protecting cover and slidably engaged in the guide hole; and
a fill-in light emitting module fixed on the protecting cover, wherein sliding the control member causes the protecting cover to move relative to the first hole for covering the camera, the first hole is an engaging hole, the guide hole is below the engaging hole, the camera module is disposed in the main body except exposing the camera via the engaging hole, the control member comprises a sliding member and a two-armed connecting member, the sliding member is slidably engaged in the elongated guide hole, and the two-armed connecting member interconnects with the protecting cover and the sliding member.

11. The portable electronic device of claim 10, wherein the guide hole is curved and extends along an arcuate part of a circle.

12. The portable electronic device of claim 10, wherein the two-armed connecting member comprises a first arm, a fixing member, and a second arm, the fixing member connects the first arm and the second arm, and the first arm is connected to the sliding member.

13. The portable electronic device of claim 12, wherein an angle defined by the first and second arms is constant.

* * * * *